ature of the present invention,
portion of the nozzle may comprise an
of hinged-overlapping deflector plates, the
of which are disposed tangentially around the
in a common plane normal to the nozzle axis,
plates together defining said convergent por-
extending from their hinge axes in the down-
direction.

United States Patent Office 3,028,730
Patented Apr. 10, 1962

3,028,730
PROPULSION NOZZLES
Frederick Ivens Clark, Bristol, England, assignor, by mesne assignments, to Bristol Siddeley Engines Limited, Bristol, England, a British company
Filed July 26, 1957, Ser. No. 674,438
Claims priority, application Great Britain July 30, 1956
4 Claims. (Cl. 60—35.6)

The present invention relates to propulsion nozzles.

It is known that when the ratio of the total pressure upstream of a propulsion nozzle to the ambient static pressure (nozzle working pressure ratio) exceeds the value which would produce a velocity of Mach 1 at the outlet of a simple convergent nozzle, it is necessary to add a divergent part to the downstream end of the nozzle in order to obtain the maximum discharge velocity from the nozzle.

It is also known to be desirable to provide for, for example, a gas turbine jet propulsion engine, a simple convergent propulsion nozzle with a variable discharge area in order to match different rates of thrust below the speed of Mach 1, and one object of the present invention is to provide a solely convergent propulsion nozzle of variable area for velocities below Mach 1 which can be adjusted to operate as a convergent-divergent nozzle for velocities in excess of Mach 1.

According to the present invention, a propulsion nozzle comprises a contractible-expandable convergent portion, and a divergent portion displaceable axially of the nozzle in the downstream direction from a position in which it is telescoped over said convergent portion and is ineffective as part of the nozzle, to an operative position in which it forms an effective downstream continuaiton of said convergent portion when the convergent portion is at maximum expansion, adjusting means operable to adjust the degree of contraction of said convergent portion thereby to vary the effective discharge area of the downstream end of the convergent portion, and moving means operable to displace said divergent portion to its operative position.

When the divergent portion is ineffective as part of the nozzle, the nozzle is a solely convergent nozzle suitable for operation with velocities less than Mach 1, and when the divergent portion is in its operative position the nozzle is a convergent-divergent nozzle and is suitable for operation with velocities in excess of Mach 1. Furthermore, when the nozzle is operating as a solely convergent nozzle the discharge area of the nozzle may be varied by altering the degree of contraction of the convergent portion.

A propulsion nozzle as just defined is suitable for use with expendable or other units which are required to accelerate the aircraft which they are propelling from subsonic to super-sonic speeds after which no operation of the unit at sub-sonic speed is again required.

According to a feature of the present invention, said moving means may also be operable to withdraw said divergent portion from its operative position to an inoperative position in which it is telescoped over said convergent portion and is ineffective as a part of the nozzle, the arrangement being such that contraction of said convergent portion permits the divergent portion to be withdrawn from its operative position.

A propulsion nozzle as just defined may be adjusted as required either from a solely convergent nozzle of variable area to a convergent-divergent nozzle or from a convergent-divergent nozzle to a solely convergent nozzle of variable area.

The nozzle is therefore well suited for use with a propulsion unit for example a gas turbine jet propulsion engine for an aircraft intended at will for flight both above and below sonic speed.

According to a further feature of the present invention, said convergent portion of the nozzle may comprise an annular series of hinged-overlapping deflector plates, the hinge axes of which are disposed tangentially around the nozzle axis in a common plane normal to the nozzle axis, the deflector plates together defining said convergent portion and extending from their hinge axes in the downstream direction.

According to a further feature of the invention, said adjusting means may comprise a cam member in the form of a frusto-conical shroud surrounding the deflector plates, said shroud being movable axially of the nozzle in the upstream direction to pivot the deflector plates inwardly about their hinge axes thereby to contract said convergent portion of the nozzle.

One embodiment of the present invention will now be described merely by way of example with reference to the drawings accompanying the provisional specification in which.

Figure 3:
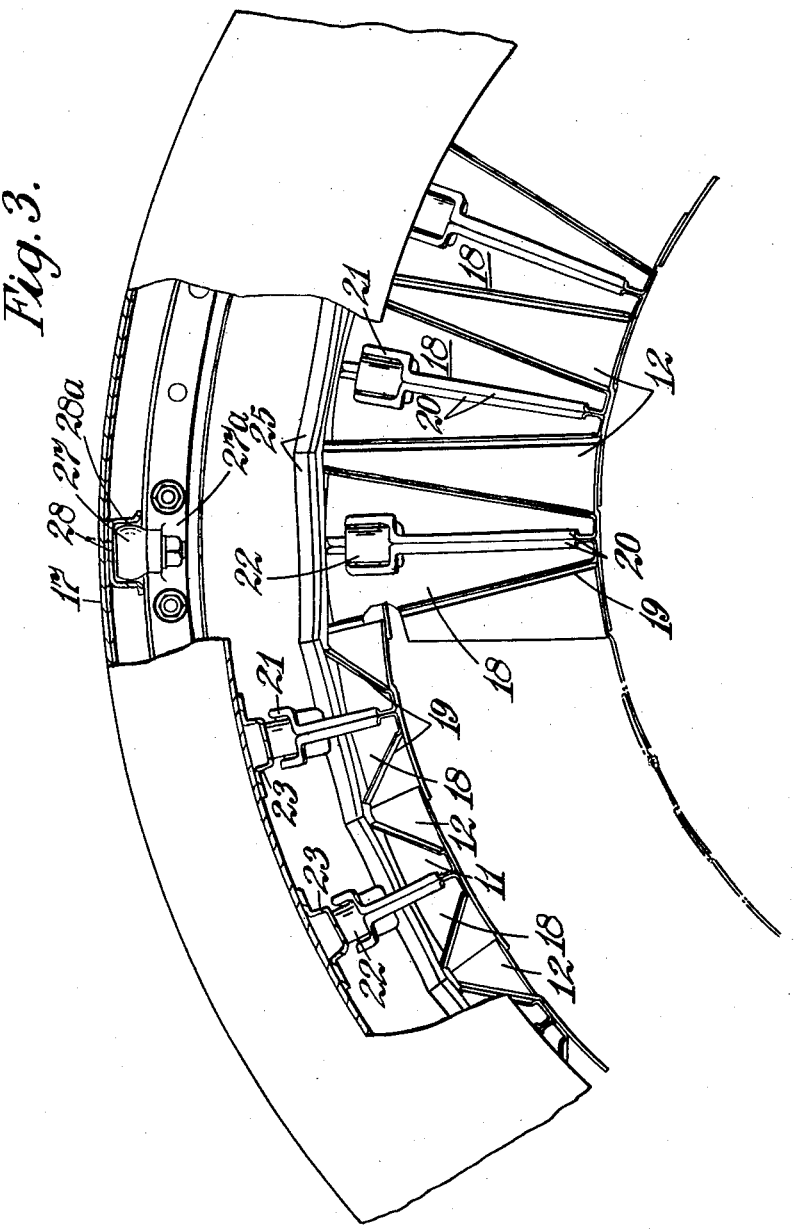

FIGURE 3 is an end section of the nozzle showing the deflector plates and frusto-conical shroud by means of which the nozzle area is varied, the left-hand portion of the figure showing the nozzle with its convergent portion at maximum expansion the right-hand portion showing the nozzle in its convergent portion at maximum contration, and FIGURE 40 shows, diagrammatically, pressure-differential-responsive control means for actuating moving parts of the nozzle.

Figure 1:
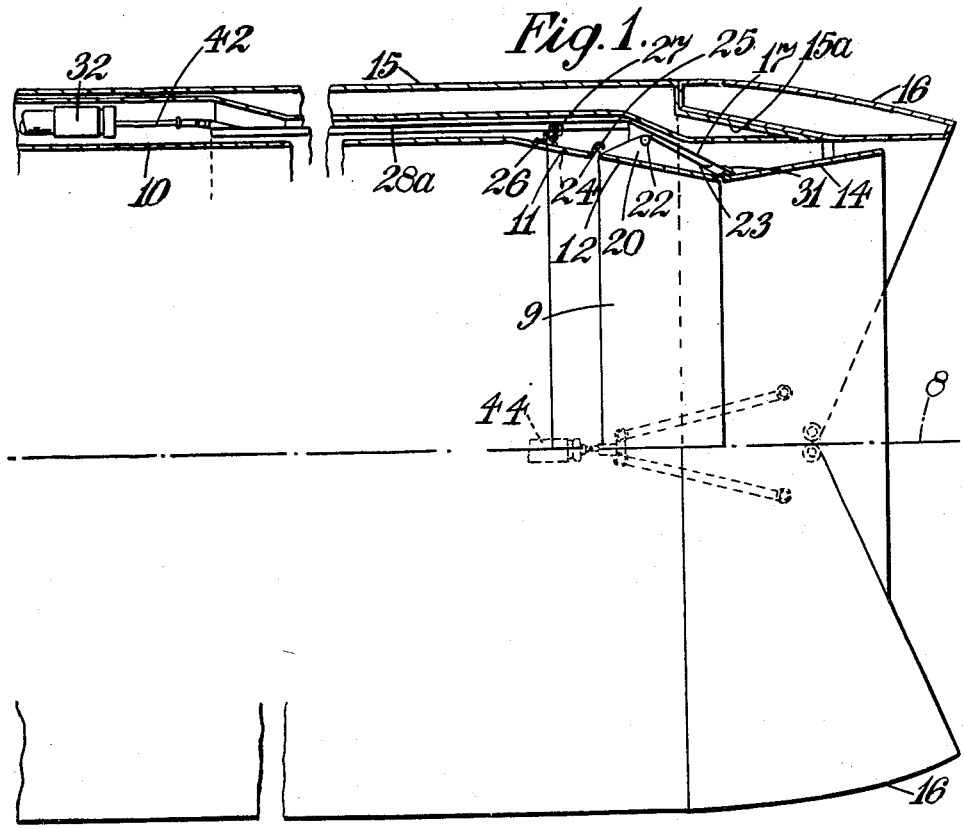
FIGURE 1 shows partly in section, partly in elevation, one form of gas turbine jet propulsion engine convergent-divergent propulsion nozzle, according to the invention, the nozzle being adapted for supersonic velocity and provided with a thrust reverser shown in its inoperative position.
Figure 2:
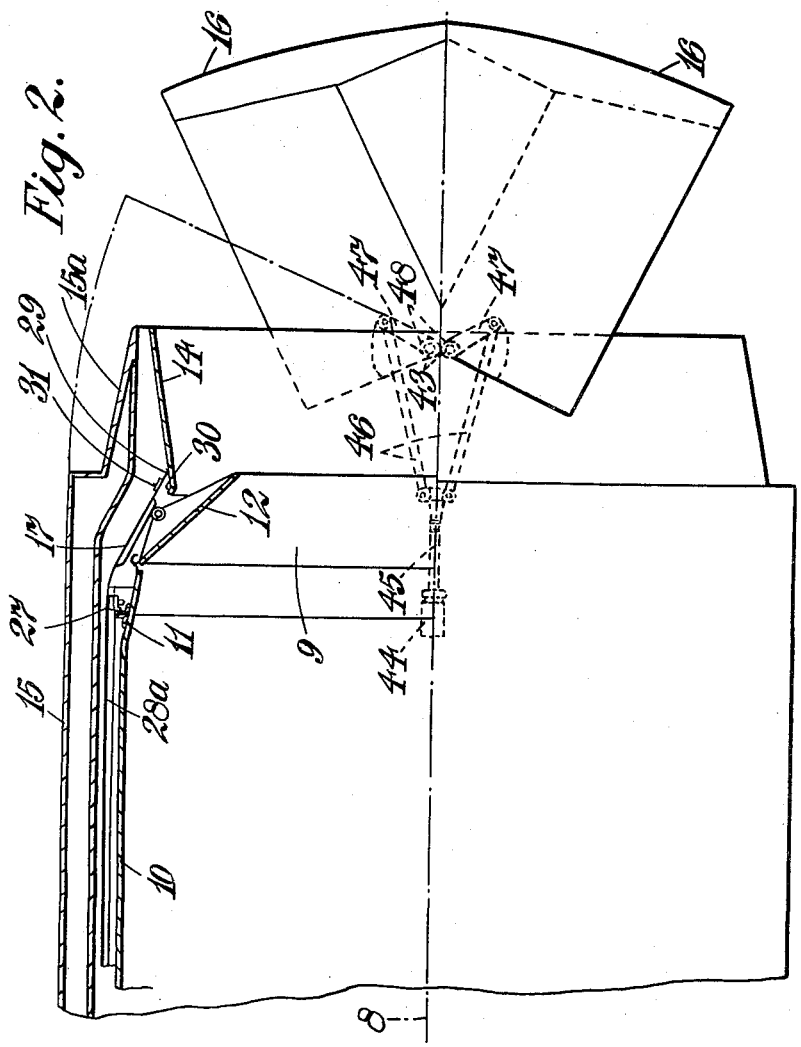
FIGURE 2 shows partly in section, partly in elevation, the same nozzle adapted for sub-sonic velocity and with the thrust reverser shown in its fully operative position.

Referring to FIGURES 1 and 2, the propulsion nozzle comprises a cylindrical portion 10 for attachment to the engine jet pipe (not shown), followed by a convergent portion 11, followed by a further convergent portion 9 composed of an annular series of hinged overlapping deflector plates, 12. The nozzle also comprises a divergent portion 14 displaceable axially of the nozzale between an inoperative position in which it is telescoped over the convergent portion 9 as shown in FIGURE 2 and an operative position in which it forms an effective downstream continuation of the convergent portion 9 as shown in FIGURE 1. An outer casing or nacelle 15 surrounds the nozzle, and a rear portion 15a of the nacelle supports double visor members 16 of a thrust reverser. A cam member in the form of a frusto-conical shroud 17 for controlling the degree of contraction of the deflector plates 12 is located between the nozzle and the outer casing 15, and carries the divergent portion 14.

The deflector plates 12 are each of substantially oblong shape, the plates being joggled or stepped to permit overlapping of each other in order to form a gas-tight seal. As shown in FIGURE 1, the plates form a smooth continuation between the convergent portion 11 and the divergent portion 14 when the divergent portion is in its operative position. The outer face of each of the plates 12 supports a pair of load-equalising plates 18 of sector shape, the plates 18 abutting one another in pairs each along one straight edge which is flanged as at 20, the flanges being substantially triangular in elevation (see FIGURE 1) but with their apical portions which are intermediate the ends of the flanges bulged outwardly to form cup-like bearings 21 for an annular series of rollers 22. The other straight edges of the plates 18 are also flanged as at 19. The surfaces of the rollers 22 project beyond the bearings 21 and may be engaged on roller tracks formed by reinforcing axially extending top-hat section ribs 23 to which reference is hereinafter made. The deflector plates are bent over to form hinges 24 which are engaged by claw-fitted members 25 attached to the convergent portion 11. The hinge axes of the deflector plates 12 are disposed tangentially around the nozzle axis 8 in a common plane normal to the nozzle axis as may clearly be seen in FIGURE 3, the plates extending from their hinges in the downstream direction. The portion 11 is provided with a flange 26 by means of which it is bolted to the cylindrical portion 10.

The frusto-conical shroud 17 lies between the outer casing or nacelle 15 and the annular series of deflector plates 12, and carries on its inner surface the ribs 23 previously referred to. Each rib 23 bears against one of the rollers 22, except when the shroud 17 is in its furthermost downstream position as shown in FIGURE 1 the ribs 23 and the rollers 22 constituting co-operating elements forming part of the adjusting means for the nozzle. The shroud has a rearward cylindrical extension piece 28a provided on its inner surface with a small number of well spaced, channel section, guide rails 28 which are adapted to move past guide rollers 27 secured to a flanged annular bracket 27a, the bracket 27a being bolted to the flange 26 on the fixed part of the convergent portion 11. By these means the shroud 17 is constrained to follow a straight path when it is slid axially of the nozzle. The downstream end of the shroud is provided with a flange 29 (see FIGURE 2) to which is welded the divergent portion 14 of the nozzle so that the divergent portion 14 is caused to follow the movement of the shroud. The upstream end of the divergent portion 14 which is positioned upstream of the flange 29 is outwardly flanged at 30 and abuts against the downstream edges of the deflector plates when the nozzle is functioning as a convergent-divergent nozzle, the type and area of the abutment surfaces being such as to resist the gaseous pressure and to constitute a reasonably fluid-tight seal when, as shown in FIGURE 1, the ribs 23 of the shroud lie out of contact with the rollers 22 and the pressure of the gas stream passing through the nozzle is permitted to pivot the deflector plates to their position of maximum expansion in which they are held hard against the flanged upstream end 30 of the divergent portion 14. The deflector plates in their position of maximum expansion prevent therefore any upstream movement of the divergent portion.

During operation of the engine, cooling air is caused to flow through the annular passage defined between the shroud 17 and the convergent portions of the nozzle and, with the deflector plates 12 in their position of maximum expansion as shown in FIGURE 1, escapes through a number of apertures 31 provided in the shroud on the upstream side of the flange 29. This air cools the abutment surfaces of the deflector plates and the divergent portion and militates against the risk of seizure between these surfaces. There is however a more important function for this flow of air. When the deflector plates 12 are pivoted inwardly towards the axis of the nozzle by movement of the shroud in the upstream direction, the hot gas stream passing through the nozzle is throttled and deflected away from the divergent portion 14 thus rendering the divergent portion ineffective, as part of the nozzle, but when the shroud is moved in the downstream direction towards its furthermost downstream position as shown in FIGURE 1 and the deflector plates are pivoted outwardly towards their positions as shown in FIGURE 1, by the gas stream passing through the nozzle, a critical point is reached at which the gas stream will tend to curl round the downstream ends of the deflector plates and attach itself to the wall of the divergent portion 14 so that the divergent portion would then become prematurely effective. However, under these conditions the cooling air flow passes from the aforesaid annular passage through the annular slot formed between the plates 12 and the upstream edge of the divergent portion 14 and into the divergent portion, the air flow through the slot being in the form of an annular frusto-conical sheath which acts as a fluid extension of the convergent portion formed by the plates 12. This sheath of cooling air deflects the gas stream away from the upstream end of the divergent portion as the downstream edges of the deflector plates approach the divergent portion, until finally it is shut off by the engagement of the deflector plates with the divergent portion. The cooling and injection air may be entrained from the atmosphere or, where suitable, may be bled from the compressor system of the engine.

Figure 4:
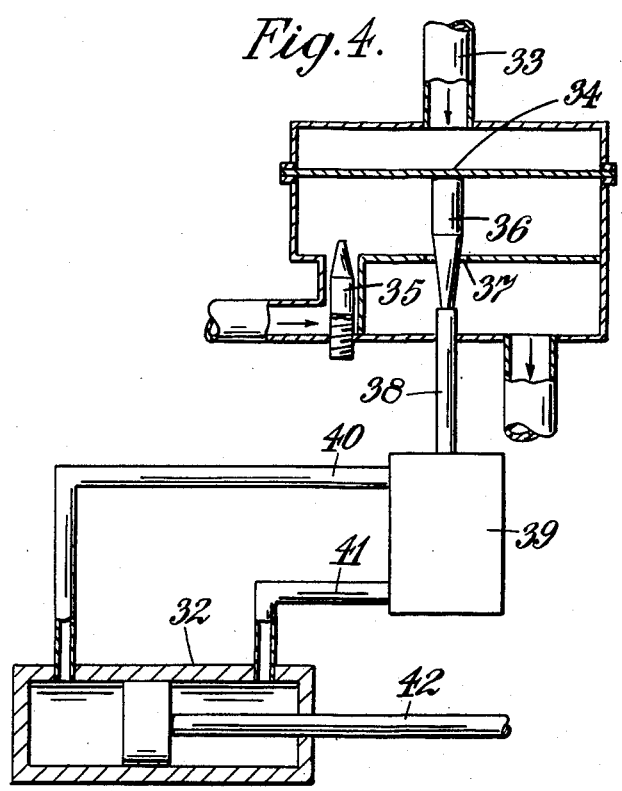

The axial movement of the shroud 17 and attached divergent portion 14 of the nozzle is under the control of any suitable control means, such as, for example, a pressure differential-responsive control means responsive to the nozzle working pressure ratio. The control means is operative to actuate double acting pneumatic or hydraulic pressure-balanced jacks 32 which are connected to the upstream end of the shroud. In the present example, referring to FIGURE 4 the control means comprises a diaphragm 34 movable in response to changes in the working pressure ratio of the nozzle, and servo-mechanism 39 for controlling the supply of working fluid to the jacks 32. The ambient static pressure is applied through a pipe 33 to one face of the diaphragm 34, and the total pressure immediately upstream of the propulsion nozzle is applied past an adjustment needle 35 to the opposing face of the diaphragm 34. A control needle 36 mounted on the diaphragm controls the flow through an orifice 37 and the needle is extended to produce a control rod 38 operatively connected with the servo-mechanism 39, movement of the rod 38 regulating the action of a servo-mechanism 39 in the manner hereinafter described. Two pressure fluid ducts 40, 41 lead from the servo-mechanism to the opposing sides of the jacks 32 each of which is connected by a transmission rod 42 to the shroud 17. In operation, as the total pressure rises the increase in pressure on the lower face of the diaphragm 34 causes the latter to deform and withdraw the needle 36 from the orifice 37 until the pressures on the opposing faces of the diaphragm have been balanced out. The resultant deformation or displacement of the diaphragm 34 causes the control rod 38 to move and regulate the action of the servo-mechanism 39, which operates the jacks 32 to move the shroud 17 downstream thereby allowing the convergent portion 9 to expand to maintain the discharge area of the convergent portion at the optimum value as the working pressure ratio of the nozzle rises. It is furthermore arranged that the divergent portion 14 reaches its operative position when the working pressure ratio has risen to a predetermined value indicative of sonic velocity having been obtained in the nozzle.

As the shroud is moved downstream, the gas stream pivots the plates 12 outwardly, the gas stream maintaining the rollers 22 in contact with the tracks 23, until the rollers move off the rear end of the tracks and the plates 12 come into sealing engagement with the divergent portion, with the divergent portion in its operative position. The nozzle is then converted to a convergent-divergent nozzle, and as the working pressure ratio continues to increase the velocity of the gas stream through the nozzle is able to rise into the supersonic range.

It will be appreciated that as the downstream edges of the plates 12 approach the divergent portion 14 the annular slot defined between them progressively narrows. The narrowing of the annular slot as the critical point is reached increases the effect of the air injection through the slot so that the tendency for the gas stream to curl round the free ends of the deflector plates and prematurely attach itself to the wall of the divergent portion is checked. As a result the effective change-over from a purely convergent nozzle to convergent-divergent nozzle is delayed until as late as possible and is finally effected without involving an appreciable indeterminate state of transition between the two conditions.

It will be realised that when the propulsion nozzle is being transformed from a solely convergent nozzle to a convergent-divergent nozzle it is not essential that the divergent portion should reach its downstream or operative position before the downstream edges of the deflector plates 12 are ready to abut the upstream end of the divergent portion. Consequently the divergent portion may be so attached to the shroud or other actuator that either it does not begin to move downstream to its operative position until after the shroud has commenced to move downstream, or that it moves at a different or variable rate to that of the shroud. In either case however the divergent portion should reach its operative position in time to allow the deflector plates—pivoting under the pressure of the gas stream—to reach their position of maximum expansion and abut against the upstream end of the divergent portion without delay.

When the nozzle is functioning as a convergent-divergent nozzle, and the working pressure ratio commences to fall, the diaphragm 34 moves downwardly in the drawing, and, through the control rod 38, adjusts the servo-mechanism 39, which, again operates the jacks 32 to move the shroud 17 in the upstream direction when the working pressure ratio has fallen to said predetermined value. When this happens, the tracks immediately engage the rollers 22 and the plates 12 are swung inwardly to contract the convergent portion 9 thus freeing the divergent portion 14 for rearward movement to an inoperative position in which it is ineffective as part of the nozzle. During rearward movement of the shroud, the pressure on the rollers 22 is transmitted evenly by the load-equalising plates 18 to the plates 12, and distortion of the plates 12 is thereby avoided.

The thrust spoiler or reverser comprises two visor members 16 mounted on pivot pins 43 which extend outwardly from a rear portion of the outer casing or nacelle 15, this portion being adapted to form a seating 15a for the visor members when they are in their inoperative position, as shown in FIGURE 1. In their inoperative position the visor members constitute the rear fairing of the outer casing. A control mechanism for the thrust reverser comprises a pair of diametrically disposed operating jacks 44 connected by rods 45 and levers 46, 47 to collars 48 mounted on the pivot pins 43. The levers 46, 47 are secured at their adjacent ends to the two visor members 16 and movement of the jacks 44 to the right, as seen in FIGURE 2, causes the visor members to pivot about the pivot pins 43 in a rearward and inward direction until they meet and extend across the nozzle outlet, forming a concave baffle which reverses the gas stream issuing from the nozzle in the known manner. It will be noted that the faired curvature of the two members 16 is utilized to form a baffle of the advantageous concave shape when the thrust reverser is in operation.

If desired, the control system for moving the shroud 17 may be replaced by a "Microjet" control system as described in the paper by W. E. Reed read at the Golden Anniversary Aeronautical meeting of the Society of Automotive Engineers October 11–15, 1955, and thereafter published by that society.

I claim:

1. A propulsion nozzle comprising an expandible-contractible convergent portion movable from a first position in which it has its maximum effective discharge area to a second position in which it has its minimum effective discharge area, a divergent portion movable in a downstream direction from an inoperative position in which it is telescoped over said expandible-contractible portion to an effective position in which it forms a continuation of said expandible-contractible portion when in its first position and moving means operatively connected to both said convergent portion and said divergent portion to move them in synchronism to and from the expandible-contractible portion's first and second positions and the divergent portion's effective and inoperative positions respectively.

2. A propulsion nozzle comprising a expandable-contractible convergent portion movable from a first position in which it has its maximum effective discharge area to a second position in which it has its minimum effective discharge area, divergent portion movable in a downstream direction from a first position in which it is telescoped over said convergent portion to an effective position in which it forms a continuation of said convergent portion when the latter is in its first position, the edges of said convergent portion and said divergent portion which are adjacent when said divergent portions forms a continuation of said convergent portion to form the throat of said propulsion nozzle forming between them a variable area air inlet nozzle in all relative positions of said convergent portion and said divergent portion except when the latter forms a continuation of the former, a source of pressure fluid, and duct means between said source and said air inlet nozzle for conveying pressure fluid from said source to said air inlet nozzle and moving means operatively connected to both said convergent portion and said divergent portion to move them in synchronism to and from the expandible-contractible portion's first and second positions and the divergent portion's effective and first positions respectively.

3. A propulsion nozzle comprising a contractible-expandable convergent portion, adjusting means including a shroud movable axially of the nozzle, in the upstream direction to increase the degree of contraction of said convergent portion and in the downstream direction to decrease the degree of contraction of said convergent portion, and a divergent portion fixed to said shroud so as to be in an operative position in which it forms an effective downstream continuation of the convergent portion when the shroud is in its furthermost downstream position corresponding to maximum expansion of the convergent portion, the divergent portion in all other positions of the shroud being telescoped over the convergent portion and ineffective as part of the nozzle.

4. A propulsion nozzle as claimed in claim 3, wherein said convergent portion of the nozzle comprises an annular series of hinged-overlapping deflector plates, the hinge axes of which are disposed tangentially around the nozzle axis in a common plane normal to the nozzle axis, the deflector plates together defining said convergent portion and extending from their hinge axes in the downstream direction, and said adjusting means further comprises co-operating elements on said shroud and said deflector plates respectively, said elements lying out of contact with one another when said shroud is in its furthermost downstream position, said deflector plates then, during operation of the nozzle, being held out by the gas stream in their position corresponding to maximum expansion of said convergent portion in sealing engagement with said divergent portion of the nozzle.

References Cited in the file of this patent

UNITED STATES PATENTS

| 2,487,588 | Price | Nov. 8, 1949 |
| 2,537,772 | Lundquist et al. | Jan. 9, 1951 |
| 2,551,372 | Haltenberger | May 1, 1951 |
| 2,653,445 | Halford et al. | Sept. 29, 1953 |
| 2,770,944 | Jordan | Nov. 20, 1956 |
| 2,806,349 | Yeager | Sept. 17, 1957 |

FOREIGN PATENTS

| 1,018,650 | France | Oct. 15, 1952 |
| 654,344 | Great Britain | June 13, 1951 |